US006321447B1

(12) United States Patent
Laurer et al.

(10) Patent No.: US 6,321,447 B1

(45) Date of Patent: Nov. 27, 2001

(54) CONCENTRIC WRENCH FOR BLIND ACCESS OPENING IN A TURBINE

(75) Inventors: Kurt Neal Laurer, Saratoga Spring, NY (US); Gary Joseph Drlik, Fairfield; Edward Eugene Gibler, Cincinnati, both of OH (US)

(73) Assignee: General Electric Company, Schnectady, NY (US)

( * ) Notice: Subject to any disclaimer, the term of this patent is extended or adjusted under 35 U.S.C. 154(b) by 0 days.

(21) Appl. No.: 09/523,964

(22) Filed: Mar. 13, 2000

Related U.S. Application Data

(62) Division of application No. 09/224,975, filed on Jan. 4, 1999, now abandoned.

(51) Int. Cl.[7] ........................................ B23P 6/00

(52) U.S. Cl. ........................................ 29/889.1; 29/525.11

(58) Field of Search ........................................ 29/889.1, 525.08, 29/525.11, 525.01

(56) References Cited

U.S. PATENT DOCUMENTS

| | | | | |
|---|---|---|---|---|
| 3,779,105 | * | 12/1973 | Triplett et al. | 81/121 |
| 4,329,892 | * | 5/1982 | Daigle | 81/55 |
| 4,393,583 | * | 7/1983 | Zwald | 29/857 |
| 4,522,090 | * | 6/1985 | Kittle | 81/55 |

* cited by examiner

*Primary Examiner*—I. Cuda Rosenbaum

(74) *Attorney, Agent, or Firm*—Nixon & Vanderhye

(57) ABSTRACT

The concentric wrench includes an outer tube having flats at one end and a gripping surface at an opposite end. An inner tube has interior flats at one end and a gripping surface at its opposite end. With the inner and outer tubes disposed about a pressure transmitting conduit, the tubes may be inserted into a blind access opening in the outer turbine casing to engage the flats of the tubes against hex nuts of an internal fitting. By relatively rotating the tubes using the externally exposed gripping surfaces, the threaded connection between the parts of the fitting bearing the respective hex nuts can be tightened or loosened.

3 Claims, 4 Drawing Sheets

CONCENTRIC WRENCH FOR BLIND ACCESS OPENING IN A TURBINE

This is a divisional of application Ser. No. 09/224,975, filed Jan. 4, 1999, Abn.

This invention was made with Government support under Contract No. DE-FC21-95MC31176 awarded by the Department of Energy. The Government has certain rights in this invention.

TECHNICAL FIELD

The present invention relates to a concentric wrench for tightening or loosening a fitting at the bottom of a blind access opening in a turbine, and particularly relates to a concentric wrench for tightening or loosening a recessed fitting for a pressure tap from the outside surface of the gas turbine casing and methods of using the wrench.

BACKGROUND OF THE INVENTION

Sensing devices are typically employed in internal spaces within a turbine. For example, pressure taps are often required on nozzle segments inside a gas turbine. Pressure taps are employed to measure the pressure within internal spaces inside the casing and are connected through the casing to an external pressure measuring device. Particularly, a pressure tap consists of tubing that attaches to a portion of the turbine, e.g., a nozzle segment, and passes through a penetration in the turbine casing to a location external of the casing. The penetration is typically an elongated opening or bore for access to the pressure tap fitting. Parts of the turbine are movable relative to one another during assembly and disassembly necessitating access to the fittings to connect or disconnect the fittings within the casing as applicable. As a specific example, nozzle segments in turbines are typically rotated circumferentially in the turbine casing for assembly/disassembly. This requires the pressure tap tubing to have a pressure fitting between the nozzle segment and the outer turbine casing for tightening/loosening the fitting from outside the turbine casing. There is no access to the pressure fitting from inside the turbine casing because the turbine rotor is in place.

A pressure fitting may comprise a first sub-assembly including a female threaded collar secured to a pressure transmitting conduit, the opposite end of the conduit extending into the cavity whose pressure is to be measured. The fitting also includes a second sub-assembly including a male threaded collar for threaded engagement with the female collar, the male threaded collar also being secured to a conduit extending through the blind opening in the casing to a location external of the casing. When the collars are threaded to one another, a complete pressure transmitting passage from the cavity through the connected conduits to the external pressure sensor is provided. Consequently, a mechanism is necessary to enable tightening/loosening the fitting including connecting/disconnecting the collars relative to one another through a blind opening from a location external of the turbine casing.

BRIEF SUMMARY OF THE INVENTION

In accordance with the present invention, there is provided a concentric wrench for insertion into the blind access opening in the casing and which wrench is capable of rotating the first and second sub-assemblies of the fitting relative to one another to enable connection/disconnection or loosening/tightening without direct, i.e., with blind access to the fitting. To accomplish this, the concentric pressure tap wrench of the present invention includes an outer tube having gripping surfaces, for example, flats, along an interior surface of the outer tube adjacent one end thereof for engaging flats formed on the first sub-assembly, for example, the female threaded collar. The opposite end of the outer tube also has a gripping surface by which the tube can be gripped by a tool for holding the tube. A second elongated element has flats along one end thereof for engagement with corresponding flats on the second sub-assembly. Preferably, the second sub-assembly also includes a hex nut secured to the conduit at a location closely adjacent the male threaded collar. The second elongated element preferably comprises a tube for disposition in the outer concentric tube and likewise has gripping surfaces adjacent an opposite end for engagement by another tool.

In using the concentric pressure tap wrench hereof, the outer and inner tubes are disposed about the pressure transmitting conduit extending from the fitting through the blind access opening to a location external to the casing. The tubes are disposed in the blind access opening of the casing and the flats thereof engage the corresponding flats of the first and second sub-assemblies of the fitting. By holding the outer tube against rotation, e.g., by engaging a tool against its outer gripping surface accessible externally of the casing, and engaging another tool with the gripping surface of the inner tube to rotate the latter relative to the outer tube, it will be appreciated that the sub-assemblies and hence the collars can be rotated relative to one another in directions loosening or tightening the threaded connection between the collars.

In a preferred embodiment according to the present invention, there is provided for use in rotating machinery having a stationary outer casing and an access opening through the casing to a fitting recessed in the opening, the fitting including relatively rotatable first and second members for loosening or tightening first and second parts of the fitting relative to one another, a concentric wrench affording blind access through the access opening to the members of the fitting comprising an elongated hollow outer tube for disposition in the opening and having flats formed along an interior surface adjacent a first end thereof for engaging the first part of the fitting and an elongated inner element for disposition in the opening and within the outer tube, the element having flats adjacent a first end thereof for engaging a second part of the fitting, opposite ends of each of the tube and the element having gripping surfaces engageable by tools external to the casing for rotating the tube and the element relative to one another to loosen or tighten the first and second parts of the fitting relative to one another.

In a further preferred embodiment according to the present invention, there is provided in rotating machinery having a stationary outer casing and an access opening through the casing to a fitting recessed in the opening and wherein the fitting includes relatively rotatable first and second members for loosening or tightening first and second parts of the fitting relative to one another, a method of loosening or tightening the parts of the fitting relative to one another comprising the steps of inserting an elongated hollow outer tube into the opening, engaging a gripping surface on an interior surface portion of the outer tube adjacent one end thereof with the first member and disposing an elongated element within the outer tube, engaging a gripping surface on the element adjacent one end thereof with the second member, while holding an opposite end portion of one of the tube and the element and the first or second member engaged thereby against rotation, rotating another of the tube and the element and the first or second member engaged thereby to relatively rotate the first and second members to loosen or tighten the parts relative to one another.

Accordingly, it is a primary object of the present invention to provide a concentric pressure tap wrench enabling tightening/loosening of a pressure fitting in a blind access opening in a turbine.

DETAILED DESCRIPTION OF THE INVENTION

Figure 1:
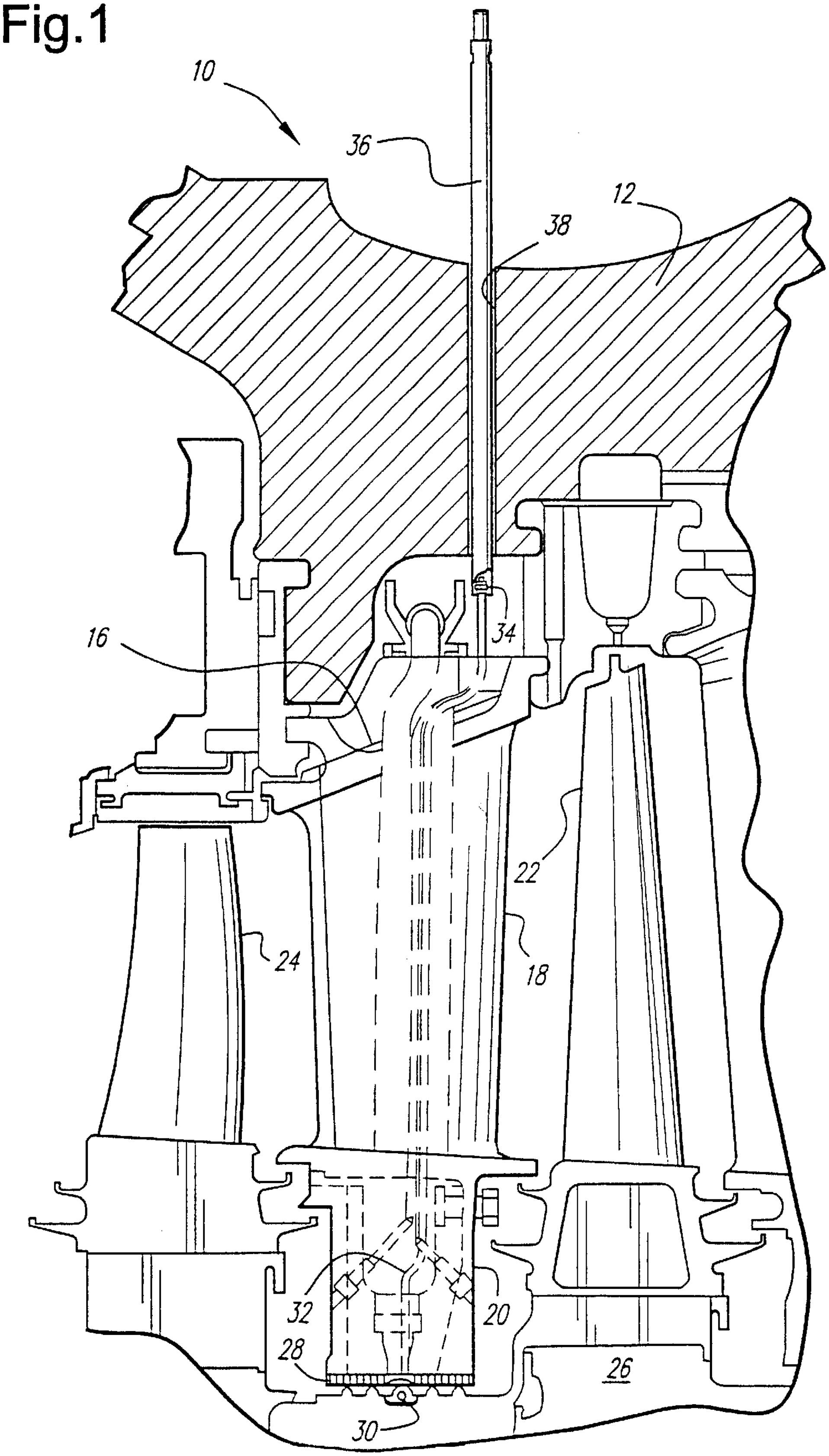
FIG. 1 is a fragmentary cross-sectional view illustrating portions of a gas turbine including a nozzle with attached diaphragm and turbine wheel buckets.

Referring now to FIG. 1, there is illustrated a turbine, for example, a gas turbine, generally designated 10, having an outer casing 12 including a frame 16 mounting a nozzle 18 in turn carrying a diaphragm 20, the nozzle 18 forming part of a stage of a turbine. The buckets of the stage and a preceding stage are indicated at 22 and 24, respectively. The turbine rotor 26 carries buckets 22 and 24 and a seal, preferably a labyrinth seal 28, is disposed between a portion of the rotor 26 and diaphragm 20.

An air cavity 30 is disposed between the diaphragm 20 and rotor 26 and it is desirable to measure the pressure of the air within the cavity 30 during operation of the turbine. To accomplish this, a first pressure transmitting conduit 32 has a radially inner end in communication with cavity 30, and extends through the diaphragm and nozzle 20 and 18, respectively, terminating in a fitting generally designated 34. A second pressure conduit 36 extends from the fitting 34 through an access opening 38 formed in the outer casing 12 for connection to a remote pressure sensor, not shown, whereby the pressure of the air in cavity 30 can be measured. For the reasons noted above, the fitting must be sealed against pressure leakage which would otherwise distort the pressure measurement, and must be capable of being loosened or tightened from a location external to casing 12.

Figure 2:
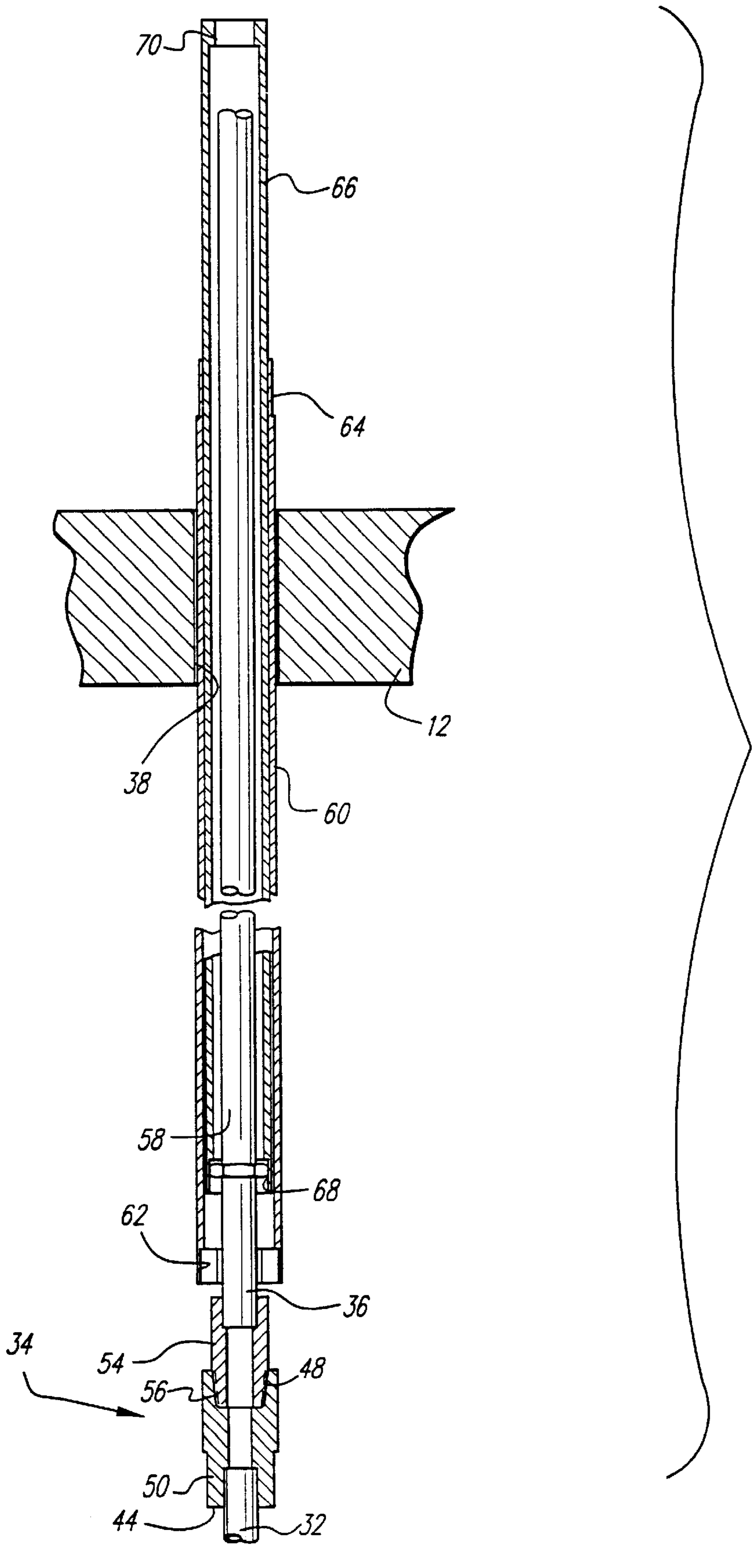
FIG. 2 is an enlarged schematic representation of a concentric pressure tap wrench constructed in accordance with the present invention being inserted into the turbine to a position for loosening/tightening a fitting.
Figure 5:
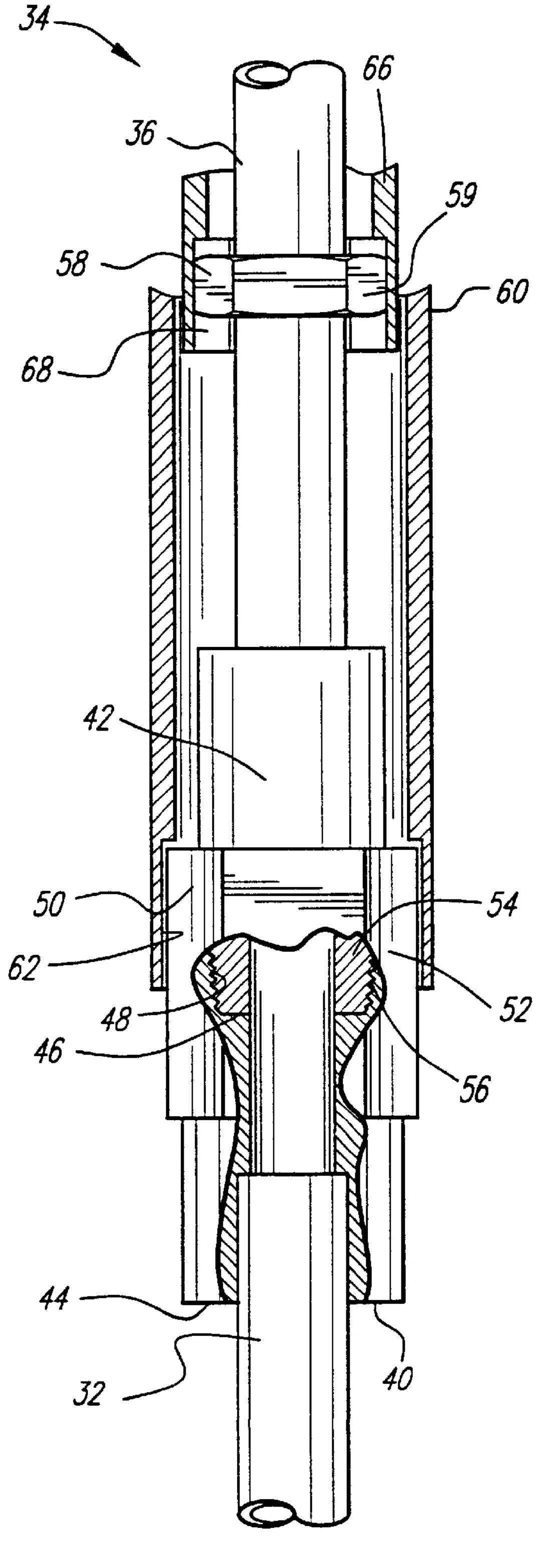
FIG. 5 is an elevational view of a representative fitting which may be loosened/tightened according to the present invention.

Referring to FIGS. 2 and 5, the fitting 34 includes first and second sub-assemblies having first and second parts 40 and 42, respectively, which are threadably engageable, one with the other. The first part 40 includes a collar 44 connected to the pressure conduit 32 and having a recess 46 at its opposite end which has female threads 48. The conduit 32 communicates with the recess 46. Fitting part 40 also includes a member 50 preferably in the form of a nut, for example, a hex nut, having flats 52 along its outer surfaces and forming an integral part of collar 44.

The second part 42 of fitting 34 includes a collar 54 connected to the second pressure transmitting conduit 36. The collar 54 has a through axial passage terminating in a male threaded end 56. The end of conduit 36 lies in the passage and is suitably affixed to the collar 54. About conduit 36 and lying adjacent collar 54 is a member 58 preferably having flats 59 about its outer surface, for example, forming a hex nut. The hex nut 58 is smaller in lateral dimension than the hex nut 50 and is secured to conduit 36, e.g., by welding.

It will be appreciated that with the fitting 34 located internally deep within the outer casing 12 of the turbine, access to the fitting cannot be obtained except through a blind opening or bore 38 in outer casing 12. Consequently, it is necessary to have the capacity to loosen or tighten the parts of the fitting relative to one another from a location external to the outer casing 12.

Figure 3:
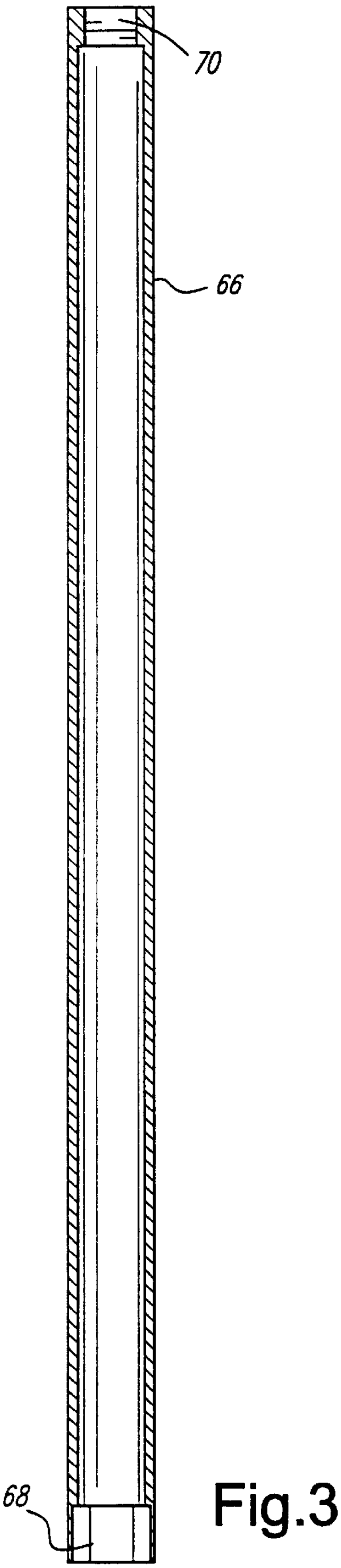
FIGS. 3 and 4 are cross-sectional views of the inner and outer tubes forming the concentric wrench hereof.
Figure 4:
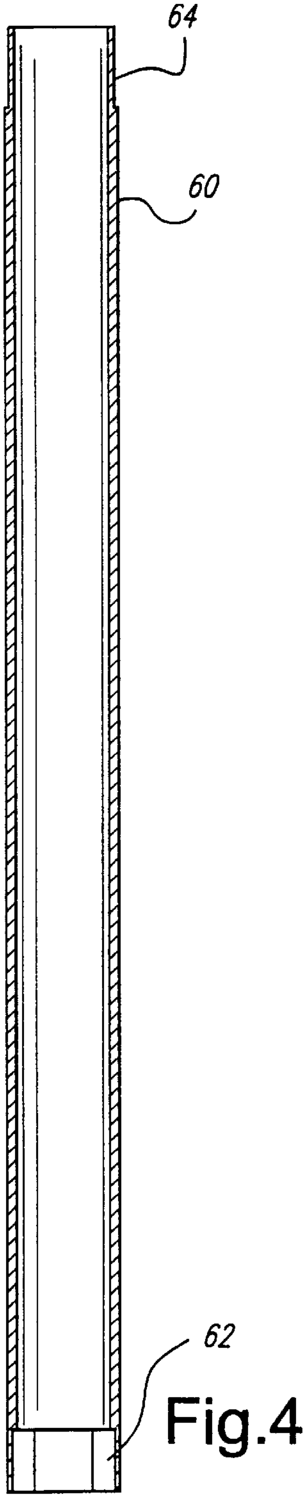

To accomplish this, a concentric wrench is provided in accordance with the present invention. Referring to FIGS. 2–4, the wrench includes an elongated, hollow outer tube 60 terminating at one end, i.e., its inner end, in a plurality of flats 62 formed along its interior surface. The flats 62 correspond in number to the number of flats 52 on the hex nut 50 formed on collar 44. Adjacent the opposite end of the outer tube 60 is a gripping surface 64 also in the form of a plurality of flats about the axis of the tube. Gripping surface 64 enables another tool, for example, a wrench, to grip the outer tube 60.

An elongated inner element, preferably also a hollow tube 66, is provided for axial reception within the outer tube 60. The inner tube 66 terminates at its inner end in a plurality of flats 68 disposed about its interior surface, the flats corresponding in number to the number of flats 59 on the hex nut 58 of the second sub-assembly. Inner tube 66 includes a gripping surface 70 adjacent its outer end, preferably comprising an inner socket, e.g., a square socket whereby the inner tube 66 can also be gripped by a suitable tool. The outer tube 60 is dimensioned to enable insertion through the opening 38 in the outer casing 12 and into the cavity in which fitting 34 resides.

To use the concentric wrench hereof, the outer and inner tubes 60 and 66, respectively, are disposed about the outer pressure transmitting conduit 36 prior to insertion of the concentric wrench into the turbine's access opening or bore 38. The conduit 36 can be disconnected from the remote sensor and the concentric tubes slipped over the outer free end of tube 36. The concentrically-disposed wrench can then be inserted through the opening 38 in outer casing 12 following the outer conduit 36 to the fitting 34. At the fitting, the flats 62 of the outer tube 60 are engaged about the larger hex nut 50 while the flats 68 of the inner tube 66 are engaged about the hex nut 58. With the conduit 36 as a guide, the operator can blindly locate the flats of both tubes about the hex nuts by feel from a location external of casing 12. Separate tools are then applied to the outer ends of the tubes 60 and 66, and particularly about the gripping surfaces 64 and 70, respectively. For example, by holding tube 60 against rotation and rotating the inner tube 66, it will be appreciated that parts of the fitting can be loosened or tightened relative to one another. Upon completion of the tightening or loosening operation, the concentric wrench may simply be withdrawn from the turbine using the outer pressure conduit 36 as a guide and withdrawn over the free end of the pressure conduit 36. The latter is then reconnected to the pressure sensor external to the casing.

It will be appreciated that the wrench hereof may be utilized to obtain blind access to a number of different fittings within the casing. For example, redundant fittings are supplied about the casing to redundantly measure the air pressure in cavity 30. It will also be appreciated that the concentric wrench may be used at other locations in the turbine to gain access to remote areas within the turbine. Additionally, where the fitting does not require a conduit extending from the fitting externally of the casing 12, it will be appreciated that the inner tube 66 may comprise a solid rod having a recess at its inner end with interior walls defining the flats 68.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of loosening or tightening first and second parts of a fitting in rotating machinery by rotating the parts relative to one another wherein the machinery has a stationary outer casing and an access opening through the casing and wherein the fitting is recessed in said opening and includes relatively rotatable first and second members for loosening or tightening the first and second parts of the fitting relative to one another, comprising the steps of:

inserting an elongated hollow outer tube into said opening;

engaging a first gripping surface on an interior surface portion of said outer tube adjacent one end thereof with the first member;

disposing an elongated element within said outer tube;

engaging a second gripping surface on said element adjacent one end thereof with the second member; and while holding an opposite end portion of one of said tube and said element and the first or second member engaged thereby against rotation, rotating another of said tube and said element and the first or second member engaged thereby to relatively rotate said first and second members to loosen or tighten said parts relative to one another.

2. A method according to claim 1 including a conduit extending from said fitting along said opening in the casing terminating at a location external of the casing and the further step of, prior to engaging said tube and said element with said respective first and second members, passing the conduit within said element and said tube so that said conduit resides within said element and said tube upon engagement of said gripping surfaces of said tube and said element with said first and second members.

3. A method according to claim 1 wherein said first part of said fitting has a female threaded collar having flats about a portion thereof, said collar being coupled to a first pressure transmitting conduit, said second part of said fitting including a male threaded collar having flats about a portion thereof, said gripping surfaces of said tube and said element having flats corresponding in number to the flats of said first and second parts, respectively, and including the step of engaging the flats of the tube and element with the flats of said collars, respectively, enabling the collars to be threadedly engaged or threadedly disengaged relative to one another.

* * * * *